United States Patent
Duan et al.

(10) Patent No.: US 11,150,461 B2
(45) Date of Patent: Oct. 19, 2021

(54) SYSTEM AND METHOD FOR PHASE CONTRAST MICROSCOPY IMAGING

(71) Applicant: Ankon Medical Technologies (Shanghai) Co., LTD, Shanghai (CN)

(72) Inventors: Xiaodong Duan, Pleasanton, CA (US); Qingqing Wang, Shanghai (CN); Qinghu You, Shanghai (CN)

(73) Assignee: ANKON MEDICAL TECHNOLOGIES (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/098,410

(22) Filed: Nov. 15, 2020

(65) Prior Publication Data

US 2021/0149177 A1    May 20, 2021

(30) Foreign Application Priority Data

Nov. 15, 2019  (CN) .......................... 201911122269.6

(51) Int. Cl.
| | |
|---|---|
| *H04N 7/18* | (2006.01) |
| *G02B 21/36* | (2006.01) |
| *G02B 21/14* | (2006.01) |
| *H04N 9/64* | (2006.01) |

(52) U.S. Cl.
CPC .......... *G02B 21/367* (2013.01); *G02B 21/14* (2013.01); *H04N 9/645* (2013.01)

(58) Field of Classification Search
CPC ....... G02B 21/367; G02B 21/14; H04N 9/645
USPC ............................................ 348/79, 76, 242
See application file for complete search history.

(56) References Cited

U.S. PATENT DOCUMENTS

| | | | | |
|---|---|---|---|---|
| 8,941,762 | B2* | 1/2015 | Hatakeyama | H04N 5/208 348/242 |
| 2010/0091101 | A1* | 4/2010 | Fujimoto | G02B 21/02 348/79 |
| 2012/0176475 | A1* | 7/2012 | Xu | G02B 21/367 348/46 |
| 2015/0323787 | A1* | 11/2015 | Yuste | G06K 9/00134 348/79 |

(Continued)

FOREIGN PATENT DOCUMENTS

| | | |
|---|---|---|
| CN | 208999644 U | 6/2019 |
| CN | 110388882 A | 10/2019 |

*Primary Examiner* — Jayanti K Patel
*Assistant Examiner* — Richard B Carter
(74) *Attorney, Agent, or Firm* — Treasure IP Group, LLC

(57) ABSTRACT

The present invention discloses a system and a method for phase contrast microscopy imaging. The system includes a microscope, a light source array, an image acquisition module and a calculation module. The light source array includes a fixture having a through hole and two light source groups arranged around the through hole. The two light source groups emit a first beam and a second beam symmetrically arranged about a optical axis of the microscope to illuminate a specimen. The light beams enter and get scattered in the specimen and are obliquely transmitted through the specimen, and collected by the microscope after passing through the through hole. The image acquisition module acquires a first image corresponding to the first beam and a second image corresponding to the second beam. The calculation module obtains a phase contrast image according to the first and second image.

8 Claims, 3 Drawing Sheets

(56) References Cited

U.S. PATENT DOCUMENTS

2017/0199362 A1\* 7/2017 Schwedt .............. G02B 21/008
2018/0047148 A1\* 2/2018 Xu ........................ G01B 11/25

\* cited by examiner

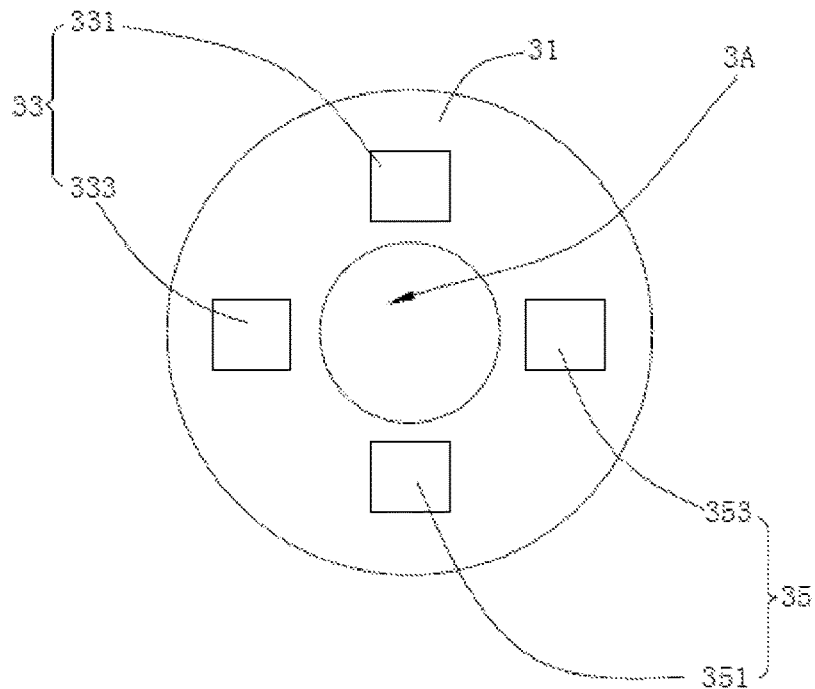

FIG. 3

| Two light source groups respectively emit a first beam and a second beam symmetrically arranged about an optical axis to illuminate a specimen, the first beam and the second beam enter and get scattered in the specimen and are obliquely transmitted through the specimen, and collected by a microscope after passing through a through hole | S1 |
|---|---|
| An image acquisition module acquires a first image corresponding to the first light beam and a second image corresponding to the second light beam on the image side of the microscope | S2 |
| A calculation module restores the primary color components of the first image and the primary color components of the second image and subtracts the primary color components obtained from the first image and the primary color components obtained from the second image to obtain a phase contrast image | S3 |

FIG. 4

SYSTEM AND METHOD FOR PHASE CONTRAST MICROSCOPY IMAGING

CROSS-REFERENCE OF RELATED APPLICATIONS

The application claims priority to Chinese Patent Application No. 201911122269.6 filed on Nov. 15, 2019, the contents of which are incorporated by reference herein.

FIELD OF INVENTION

The present invention relates to a microscopy imaging technique, and more particularly to a system and a method for phase contrast microscopy imaging.

BACKGROUND

The development of microscopy imaging technique has opened up a whole new world to human vision, allowing people to see hundreds of "new" microscopic animals and plants, as well as the internal structure of everything from the human body to plant fibers, helping scientists to discover new species and doctors to treat diseases.

Phase contrast microscopy technique is used to visualize unstained specimens. As light waves pass through living cells and unstained biological specimens, their wavelength and amplitude do not change and they are invisible to the human eye, but their phase changes. The phase contrast microscopy technique converts phase difference into amplitude difference by utilizing light diffraction and interference to visualize living cells and unstained specimens. Compared with ordinary optical microscopes and dark-field microscopes, this technique enables clearer visualization of living cells and some microstructures in the cells, so it is widely used in biology, medical diagnosis, scientific research, life sciences and other fields.

At present, phase contrast microscopy imaging has been quite mature, and is mainly based on transmission. According to the difference in refractive index and thickness between different structural components of an object, it converts the difference in optical path through different parts of the object into the difference in amplitude, and then enables the visualization of tiny biological tissues through a condenser with an annular diaphragm and a phase contrast objective with a phase plate. The annular diaphragm and the phase plate are needed. The specimen must be covered with a coverslip during observation, otherwise it is difficult for the annular diaphragm and the dark ring of the phase plate to overlap. So, the glass quality of a slide and the coverslip is highly required. Existing phase contrast microscopy technique can only observe slices with specimen thickness in the order of micrometers, which requires high thickness, and cannot realize the observation of thicker tissues (in the order of millimeters). Therefore, the technique is not real significant in the application in human biopsy.

SUMMARY OF THE INVENTION

The present invention discloses a system and a method for phase contrast microscopy imaging. The system for phase contrast microscopy imaging comes in a simple structure and is cost effective, and the method for phase contrast microscopy imaging is simple and easy to operate.

The present invention provides a system for phase contrast microscopy imaging, comprising:

a microscope with an optical axis, wherein the microscope comprises an objective;

a light source array comprises a fixture and two light source groups, wherein the fixture is disposed on the object side of the objective and has a through hole, and the two light source groups is disposed on the side of the fixture away from the objective and is arranged around the through hole, wherein the light source groups respectively emit a first beam and a second beam symmetrically arranged about the optical axis to illuminate a specimen, and wherein the first beam and the second beam enter and get scattered in the specimen and are obliquely transmitted through the specimen, and collected by the microscope after passing through the through hole;

an image acquisition module that is disposed on the image side of the microscope, for acquiring a first image corresponding to the first light beam and a second image corresponding to the second light beam;

a calculation module for restoring the primary color components of the first image and the primary color components of the second image and subtracting the primary color components obtained from the first image and the primary color components obtained from the second image to obtain a phase contrast image.

Preferably, the size of the through hole is not larger than the field of view of the objective.

Preferably, the fixture is a circuit board, and the two light source groups are powered by the circuit board.

Preferably, the specimen is located at a side of the light source array away from the objective, and the light source array is close to the specimen when the specimen is illuminated.

Preferably, the light source groups comprise a plurality of light sources, and the light sources in one light source group and the light sources in the other are arranged symmetrically about the optical axis.

Preferably, two symmetrical light sources in the light source groups are monochromatic light sources, the other light sources in the light source groups are visible light sources or monochromatic light sources, and the other light sources in different light source groups that are symmetrical about the optical axis are the same.

Preferably, the two symmetrical monochromatic light sources are same-color monochromatic light sources or different-color monochromatic light sources. When the symmetrical monochromatic light sources are same-color monochromatic light sources, the two light source groups emit the first light beam and the second light beam in sequence. When the symmetrical monochromatic light sources are different-color monochromatic light sources, the two light source groups emit the first light beam and the second light beam simultaneously or sequentially.

Preferably, one of the two symmetrical monochromatic light sources is a red primary color light source that emits red light, and the other is a blue primary color light source that emits blue light.

Preferably, one of the two symmetrical monochromatic light sources is a blue primary color light source that emits blue light, and the other is a green primary color light source that emits green light.

The present invention further provides a method for phase contrast microscopy imaging, the method comprising following steps:

two light source groups of a light source array respectively emit a first beam and a second beam symmetrically arranged about an optical axis of a microscope to illuminate a specimen, wherein the first beam and the second beam enter and get scattered in the specimen and are obliquely transmitted through the specimen, and collected by a microscope after passing through a through hole of the light source array;

an image acquisition module acquires a first image corresponding to the first light beam and a second image corresponding to the second light beam on the image side of the microscope;

a calculation module restores the primary color components of the first image and the primary color components of the second image and subtracts the primary color components obtained from the first image and the primary color components obtained from the second image to obtain a phase contrast image.

According to aspects of the invention, the two light source groups respectively emit a first beam and a second beam symmetrically arranged about the optical axis to illuminate the specimen, wherein the first beam and the second beam enter and get scattered in the specimen and are obliquely transmitted through the specimen, and then collected by the microscope after passing through the through hole. As transmitted through the specimen, the first light beam and the second light beam have a phase change which will cause a local change in the direction of transmission. Since the first beam and the second beam are arranged symmetrically about the optical axis, they have a symmetrical phase gradient after imaging. Therefore, the image acquisition module acquires the first image corresponding to the first beam and the second image corresponding to the second beam are acquired on the image side of the microscope, and the calculation module restores the primary color components of the first image and the primary color components of the second image and subtracts the primary color components obtained from the first image and the primary color components obtained from the second image to obtain a phase contrast image. The system for phase contrast microscopy imaging does not need glass slides and coverslips, and with low requirement for specimen thickness, is able to observe thick tissues and living tissues. Without using an annular diaphragm and a phase plate, it is simple in structure. Moreover, the method using the method for phase contrast microscopy imaging is simple and easy to operate.

BRIEF DESCRIPTION OF THE DRAWINGS

FIG. 3 is a structural schematic diagram of a light source array of the system for phase contrast microscopy imaging shown in FIG. 2.

FIG. 4 is a flowchart of the steps of a method for phase contrast microscopy imaging in accordance with aspects of the present invention.

DETAILED DESCRIPTION

The present invention can be described in detail below with reference to the accompanying drawings and preferred embodiments. However, the embodiments are not intended to limit the invention, and obviously, the described embodiments are only a part of the embodiments of the present invention, but not all of them. All other embodiments obtained by those having ordinary skill in the art without creative work based on the embodiments of the present invention are included in the scope of the present invention.

Figure 1:
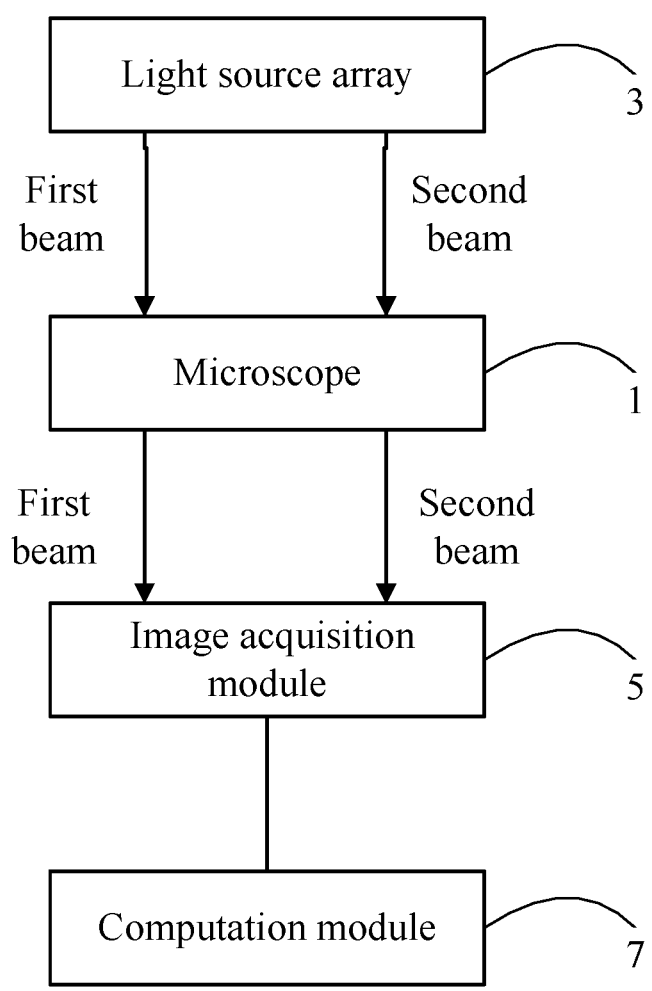
FIG. 1 is a structural block diagram of a system for phase contrast microscopy imaging in accordance with aspects of the present invention.
Figure 2:
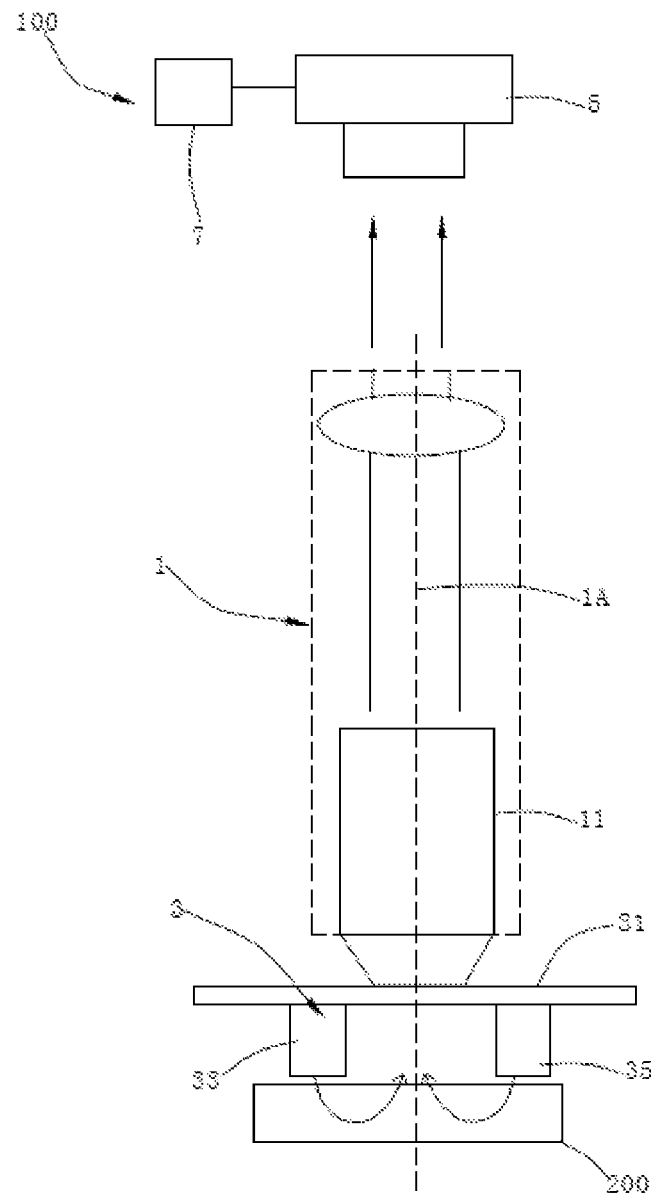
FIG. 2 is a structural schematic diagram of the system for phase contrast microscopy imaging when observing a specimen in accordance with aspects of the present invention.

Referring to FIGS. 1-3, a system for phase contrast microscopy imaging 100 comprises a microscope 1 with an optical axis 1A, a light source array 3, an image acquisition module 5 and a computation module 7.

The microscope 1 comprises an objective 11.

The light source array 3 comprises a fixture 31 and two light source groups. The fixture 31 is disposed on the object side of the objective 11 and has a through hole 3A. The two light source groups are disposed on the side of the fixture 31 away from the objective 11 and arranged around the through hole 3A. The two light source groups respectively emit a first beam and a second beam symmetrically arranged about the optical axis 1A to illuminate a specimen 200, wherein the first beam and the second beam enter and get scattered in the specimen 200 and are obliquely transmitted through the specimen 200, and then collected by the microscope 1 after passing through the through hole 3A. The first light beam and the second light beam can be RGB primary color light beams with different wavelengths. In this embodiment, the fixture 31 is a circuit board, and the two light source groups are powered by the circuit board 31.

In this embodiment, the specimen 200 is located at a side of the light source array 3 away from the objective 11. The smaller the distance between the light source array 3 and the specimen is, the better imaging quality can be obtained. The imaging quality can be the best in a close contact condition. In this embodiment, when the specimen 200 is illuminated, the light source array 3 is close to the specimen 200. That is, the distance between the light source array 3 and the specimen 200 is zero, or close to zero. In other embodiments, the distance between the light source array 3 and the specimen is less than 0.01 mm, 0.1 mm, 0.2 mm, 0.5 mm or 1 mm. The specimen 200 can be thick tissue (millimeter order) or living tissue to be observed.

Specifically, the light source groups comprise a plurality of light sources, and the light sources in one light source group and the light sources in another light source group are arranged symmetrically about the optical axis. In order to make it clear to those skilled in the art how the arrangement of the light source array 3, the two light source groups are defined as a first light source group 33 and a second light source group 35, respectively. As shown in FIG. 3, the first light source group 33 comprises two light sources 331 and 333, and the second light source group 35 comprises two light sources 351 and 353, wherein the light source 331 and the light source 351 are symmetrical, and the light source 333 and the light source 353 are symmetrical. It can be understood that each light source group may also comprise one light source, three light sources, four light sources, five light sources, or other numbers of light sources.

On the basis that two symmetrical light sources are monochromatic light sources (hereinafter referred to as "basic symmetrical light sources"), the other light sources in the light source groups can be visible light sources or monochromatic light sources, and the light sources in different light source groups that are symmetrical about the optical axis are the same. The monochromatic light is selected from R, G, and B primary colors. The basic symmetrical light sources can be same-color monochromatic light sources or different-color monochromatic light sources. When the basic symmetrical light sources are same-color monochromatic light sources, the two light source groups emit the first light beam and the second light beam in sequence. When the basic symmetrical light sources are different-color monochromatic light sources, the two light source groups can emit the first light beam and the second light beam simultaneously or sequentially. Preferably, the light beams are emitted simultaneously. For example, the light source 331 and the light source 351 are monochromatic light sources, and the light source 333 and the light source 353 are the same monochromatic light source or the same visible light source.

In this embodiment, one of the light source 331 and the light source 351 is a red primary color light source that emits red light, and the other is a blue primary color light source that emits blue light, while both the light source 333 and the light source 353 are both green primary color light sources that emit green light. Compared with the combination of other RGB light sources, such arrangement enables obtaining better phase contrast images. In addition, the image acquisition module 5 can obtain color images, and the system for phase contrast microscopy imaging 100 can be used as both a phase contrast microscope and a common microscope. In other embodiments, one of the light source 331 and the light source 351 is a red primary color light source that emits red light, and the other is a blue primary color light source that emits blue light, while both the light source 333 and the light source 353 are white light sources that emit white light. In other embodiments, one of the light source 331 and the light source 351 is a blue primary color light source that emits blue light, and the other is a green primary color light source that emits green light, while both the light source 333 and the light source 353 are white light sources that emit white light.

The light source may be an LED light or an OLED light, which is not specifically limited in the present invention.

The image acquisition module 5 is disposed on the image side of the microscope 1, and used to acquire a first image corresponding to the first light beam and a second image corresponding to the second light beam. The image acquisition module 5 can be a CMOS camera or a CCD camera. In this embodiment, when the two light source groups emit the first light beam and the second light beam simultaneously, the image acquisition module 5 is used to take an image, and acquire a first image corresponding to the first light beam and a second image corresponding to the second light beam. When the two light source groups emit the first light beam and the second light beam sequentially, the image acquisition module 5 is used to take an image corresponding to the first light beam and acquire a first image corresponding to the first light beam, and take an image corresponding to the second light beam, and acquire a second image corresponding to the second light beam.

The calculation module 7 restores the primary color components of the first image and the primary color components of the second image and subtract the primary color components obtained from the first image and the primary color components obtained from the second image to obtain a phase contrast image. The primary color components are the monochromatic light color components of the basic symmetrical light sources. For example, the light source 331 and the light source 351 are basic symmetrical light sources, the light source 331 is a red primary color light source and the light source 351 is a blue primary color light source, then the calculation module 7 restores the red components of the first image and the blue components of the second image, and subtracts the red components from the blue components to obtain a phase contrast image.

The calculation module 7 can be disposed in the microscope 1 or in an electronic device connected to the microscope 1. The electronic device can be a computer, a tablet computer, a mobile phone, or other electronic devices. In this preferred embodiment, the calculation module 7 is disposed in the microscope 1. The calculation module 7 is stored in the memory of the microscope 1 and executed by the processor of the microscope 1 to obtain a phase contrast image.

It should be noted that the algorithm for restoring the primary color components of the first image and the primary color components of the second image by the calculation module 7 is a common technical means in the prior art, and can be not specifically described herein. Specifically, the methods can be selected as follows: nearest neighbor interpolation, bilinear interpolation, cubic spline interpolation, smooth hue transition interpolation, etc.

The closer the size of the through hole 3A is closer to the field of view of the objective 11 of the microscope 1, the higher imaging quality can be obtained. Therefore, in this embodiment, the size of the through hole 3A is not larger than the field of view of the objective 11, and preferably, the size of the through hole 3A is equal to the field of view of the objective 11. In other embodiments, when the through hole 3A is smaller than the field of view of the objective 11, the distance between the through hole 3A and the field of view of the objective 11 is less than 0.01 mm, 0.1 mm, 0.2 mm, 0.5 mm or 1 mm.

Referring to FIG. 4, the present invention further provides a method for phase contrast microscopy imaging, the method comprising the following steps:

step S1, the two light source groups respectively emit a first beam and a second beam symmetrically arranged about the optical axis 1A to illuminate the specimen, wherein the first beam and the second beam enter and get scattered in the specimen and are obliquely transmitted through the specimen, and then collected by the microscope 1 after passing through the through hole. The first light beam and the second light beam can be RGB primary color light beams with different wavelengths.

step S2, the image acquisition module 5 acquires a first image corresponding to the first light beam and a second image corresponding to the second light beam on the image side of the microscope 1.

step S3, the calculation module 7 restores the primary color components of the first image and the primary color components of the second image and subtract the primary color components obtained from the first image and the primary color components obtained from the second image to obtain a phase contrast image.

According to aspects of the invention, the two light source groups respectively emit a first beam and a second beam symmetrically arranged about the optical axis to illuminate the specimen, wherein the first beam and the second beam enter and get scattered in the specimen and are obliquely transmitted through the specimen, and then collected by the microscope after passing through the through hole. As transmitted through the specimen, the first light beam and the second light beam have a phase change which can cause a local change in the direction of transmission. Since the first beam and the second beam are arranged symmetrically about the optical axis, they have a symmetrical phase gradient after imaging. Therefore, the image acquisition module acquires the first image corresponding to the first beam and the second image corresponding to the second beam are acquired on the image side of the microscope, and the calculation module restores the primary color components of the first image and the primary color components of the second image and subtracts the primary color components obtained from the first image and the primary color components obtained from the second image to obtain a phase contrast image. The system for phase contrast microscopy imaging does not need glass slides and coverslips, and with low requirement for specimen thickness, is able to observe thick tissues and living tissues. Without using an annular diaphragm and a phase plate, it is simple in structure. Moreover, the method for phase contrast microscopy imaging is simple and easy to operate.

The above are only embodiments of the present invention, and it should be noted that improvements may be made by one of ordinary skill in the art without departing from the creative conception of the invention, but these improvements are within the scope of protection of the present invention.

What is claimed is:

1. A system for phase contrast microscopy imaging, comprising:
    a microscope with an optical axis, wherein the microscope comprises an objective;
    a light source array comprises a fixture and two light source groups, wherein the fixture is disposed on the object side of the objective and has a through hole, and the two light source groups is disposed on the side of the fixture away from the objective and is arranged around the through hole, wherein the two light source groups respectively emit a first beam and a second beam symmetrically arranged about the optical axis to illuminate a specimen, and wherein the first beam and the second beam enter and get scattered in the specimen and are obliquely transmitted through the specimen, and collected by the microscope after passing through the through hole;
    an image acquisition module that is disposed on the image side of the microscope, for acquiring a first image corresponding to the first light beam and a second image corresponding to the second light beam;
    a calculation module for restoring primary color components of the first image and the primary color components of the second image and subtracting the primary color components obtained from the first image and the primary color components obtained from the second image to obtain a phase contrast image;
    wherein the light source groups comprise a plurality of light sources, and the light sources in one light source group and the light sources in the other are arranged symmetrically about the optical axis;
    wherein two symmetrical light sources in the light source groups are monochromatic light sources, the other light sources in the light source groups are visible light sources or monochromatic light sources, and the other light sources in different light source groups that are symmetrical about the optical axis are the same.

2. The system of claim 1, wherein the size of the through hole is not larger than the field of view of the objective.

3. The system of claim 1, wherein the fixture is a circuit board, and the two light source groups are powered by the circuit board.

4. The system of claim 1, wherein the specimen is located at a side of the light source array away from the objective, and the light source array is close to the specimen when the specimen is illuminated.

5. The system of claim 1, wherein the two symmetrical monochromatic light sources are same-color monochromatic light sources or different-color monochromatic light sources, and when the symmetrical monochromatic light sources are same-color monochromatic light sources, the two light source groups emit the first light beam and the second light beam in sequence, and when the symmetrical monochromatic light sources are different-color monochromatic light sources, the two light source groups emit the first light beam and the second light beam simultaneously or sequentially.

6. The system of claim 1, wherein one of the two symmetrical monochromatic light sources is a red primary color light source that emits red light, and the other is a blue primary color light source that emits blue light.

7. The system of claim 1, wherein one of the two symmetrical monochromatic light sources is a blue primary color light source that emits blue light, and the other is a green primary color light source that emits green light.

8. A method for phase contrast microscopy imaging, comprising following steps:
    two light source groups of a light source array respectively emit a first beam and a second beam symmetrically arranged about an optical axis of a microscope to illuminate a specimen, wherein the first beam and the second beam enter and get scattered in the specimen and are obliquely transmitted through the specimen, and collected by a microscope after passing through a through hole of the light source array;
    an image acquisition module acquires a first image corresponding to the first light beam and a second image corresponding to the second light beam on the image side of the microscope;
    a calculation module restores the primary color components of the first image and the primary color components of the second image and subtracts the primary color components obtained from the first image and the primary color components obtained from the second image to obtain a phase contrast image.

* * * * *